Figure 1:
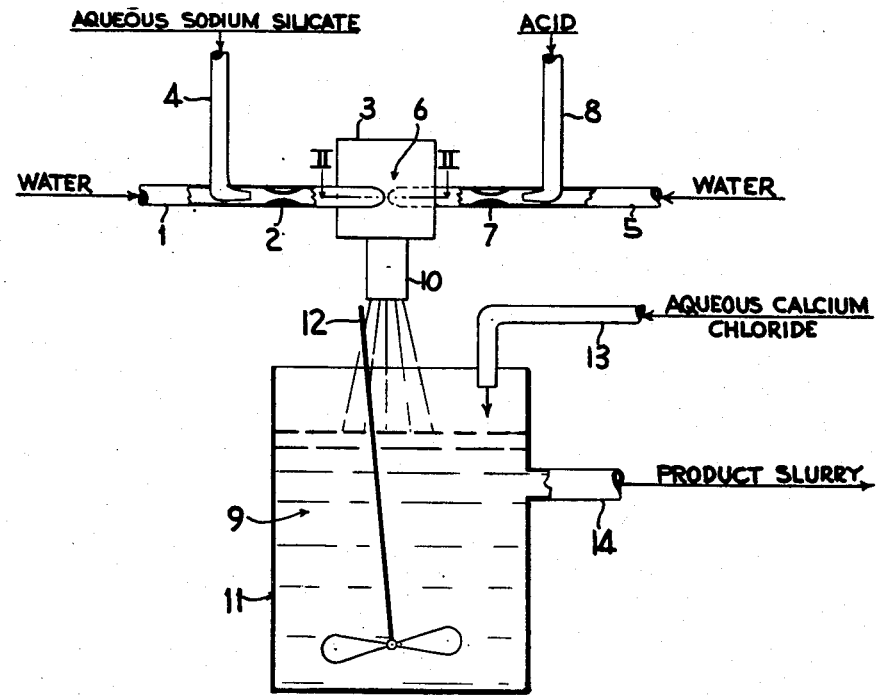

3,108,892
PIGMENT PROCESS
Stanley Krinov, Pittsburgh, Pa., assignor, by mesne assignments, to Pittsburgh Plate Glass Company
Filed Dec. 5, 1960, Ser. No. 73,806
3 Claims. (Cl. 106—309)

This invention deals with precipitated, finely divided, siliceous pigments. It more particularly concerns the manufacture of siliceous pigments, including those especially effective for enhancing optical properties of paper.

Application Serial No. 811,183 of Gosta B. Lagerstrom, filed May 5, 1959, now U.S. Patent No. 3,034,913, and assigned to the assignee of this application, describes the preparation of water insoluble precipitated, finely divided, siliceous pigments, including the pigments which are extremely effective in enhancing the optical properties of paper. In the method therein described, exemplary siliceous pigments are prepared by (1) partially neutralizing an aqueous solution of alkali metal silicate such as sodium silicate to obtain a siliceous solution which is metastable, e.g., has a tendency to deposit from solution water insoluble siliceous precipitate upon standing, and (2) precipitating the dissolved siliceous material from such solution by mixing with a salt such as calcium chloride. This salt induced precipitation, and hence formation of the desired water insoluble siliceous pigmentary materials, is accomplished before substantial water insoluble siliceous material deposits from the solution due to its metastable condition. Typically, in such method, hydrochloric acid or like acid and an aqueous sodium silicate solution are mixed in appropriate proportions to form the desired siliceous solution. The acid and alkali metal silicate are so proportioned that in the resulting solution the mole ratio of $SiO_2$ to $Na_2O$ is such that siliceous material would normally precipitate from solution. Promptly after forming this metastable siliceous solution, siliceous pigment is precipitated therefrom by mixing with a salt such as calcium chloride.

Said application discusses the significance of precipitating siliceous pigmentary material from the partially neutralized solution while avoiding formation of siliceous precipitate occasioned as the consequence of the metastable condition of the solution. Among other things, the siliceous pigment realized by salt initiated precipitation is a superior paper pigment.

Thus, quite vital to the preparation of siliceous pigments in accordance with the aforedescribed method is the formation of partially neutralized siliceous solution under those conditions which preclude the formation of water insoluble siliceous material in any substantial amount and the prompt achievement by salt induced precipitation of siliceous pigmentary material before the appearance of undesired water insoluble siliceous material. Quite frequently, and particularly when operating under commercially economic conditions, the attainment of these desiderata is not simple. For example, salt induced precipitation frequently must be accomplished within but a fraction of a second after forming the siliceous solution, lest the undesirable water insoluble siliceous material be formed in significant quantities. Not only is this necessary, but it is important the salt be effectively distributed throughout the partially neutralized siliceous solution.

Additionally, the partial neutralization of the aqueous alkali metal solution ideally should avoid localized conditions of high acid concentration. This would lead to the formation of water insoluble precipitate.

By virtue of this invention, the siliceous solution prepared by partial neutralization of an alkali metal silicate solution is substantially free of undesirable water insoluble siliceous precipitate. In addition, this invention provides for ideally mixing such siliceous solution with a water soluble salt to effect salt induced precipitation of exemplary siliceous pigment compositions. These and other ends are attained in the manufacture of the siliceous pigments on a large scale. Effectiveness of the invention here in large scale production of pigments is especially significant since prerequisite conditions for production of exemplary siliceous pigments are not easily insured when handling large volumes of solution.

In accordance with the present invention, it has now been found that finely divided, siliceous pigments are prepared by the aforedescribed general method when the partially neutralized siliceous solution is established by mixing (and reacting) the respective solutions of alkali metal silicate and acid (or other neutralizing agent) in the form of a spiraling stream. In this fashion, the acid and sodium silicate are mixed (and reacted) promptly to form a homogeneous siliceous solution. Substantially no water insoluble siliceous material forms in the resulting siliceous solution. Promptly after providing this partially neutralized aqueous alkali metal silicate solution, it is contacted with calcium chloride or like salt. When so contacted, precipitation of the desired siliceous pigmentary composition occurs.

By virtue of mixing the respective streams of neutralizing agent and aqueous sodium silicate in a spiraling stream of considerable velocity, the resulting siliceous solution is formed almost instantaneously upon contact with each other of the respective streams. In addition, concurrently with the initial contact of the respective streams, there results an essentially homogeneous mixture. Substantially avoided are localized conditions which depart from those which are desired.

In an illustrative embodiment, independent liquid streams of aqueous sodium silicate solution and acid are separately introduced into a cylindrical mixing zone, preferably through spaced conduits positioned to discharge the streams in a substantially tangential line of flow with respect to the circular periphery of the zone. Usually, the liquid streams are under superatmospheric pressure, e.g., at least 25 pounds per square inch gauge, and are moving with considerable linear velocity.

Through an outlet communicating with the cylindrical zone positioned below the level at which the respective streams are introduced, the resulting aqueous siliceous solution is discharged. This discharge is directed into an aqueous body of calcium chloride or like metal salt, usually simply by positioning a liquid level of such body below the opening through which material is discharged from the cylindrical zone.

One appropriate mixing zone is provided by a right cylindrical cavity within a mixing block. The respective liquid feeds are introduced into the cavity through conduits disposed to discharge liquids tangentially into the zone. From the lower extremity of the zone (below the level of liquid feeds), the medium resulting from the mixing is withdrawn from the cavity. There is thus created in the cavity a downwardly spiraling path of liquid movement; i.e., a liquid vortex. With the discharge port in the geometric center of the cavity bottom, the vortex is in the form of an inverted hollow cone, e.g., a downwardly tapering cone.

Figure 2:
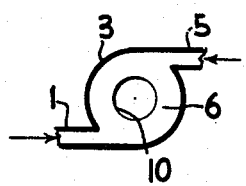

The invention may be readily described by reference to the drawing. FIGURE 1 is a schematic illustration of the apparatus and materials employed in typical performance of the invention. FIGURE 2 is a schematic cross-sectional representation of the mixing block.

Thus, the contemplated production of siliceous pigment is achieved by presenting to mixing zone 6 within mixing block 3 aqueous streams of alkali metal silicate solution and acid. This is done by forwarding water under pressure through conduit 1 past throats 2. The venturi effect inspirates aqueous sodium silicate through tube 4 into conduit 1, accomplishing dilution of the silicate solution immediately prior to introducing silicate into zone 6 and into contact with acid.

Typically, the aqueous sodium silicate fed through conduit 4 contains above 30 and up to 150 grams $Na_2O$ per liter and between 1 and 5 moles of $SiO_2$ per mole of $Na_2O$. Sufficient water is mixed with this solution such that the aqueous silicate solution fed to zone 6 contains less than about 15 grams, usually 2 to 10 grams, $Na_2O$ per liter.

Acid or neutralizing agent such as hydrochloric acid is fed to zone 6 in a comparable manner. Water under pressure is passed through conduit 5 and the venturi effect created by throats 7 inspirates acid through conduit 8.

As shown in FIGURE 2, conduits 1 and 5 are equidistantly spaced around the periphery of zone 6 and so disposed that the respective liquids enter zone 6 tangentially to its periphery.

Liquid in zone 6 discharges through conduit 8 into liquid body 9 of aqueous calcium chloride or other metal chloride in tank 11. Agitator 12 maintains body 9 in a goodly state of agitation. Necessary calcium chloride is added to body 9 through conduit 13. In this fashion, siliceous pigment is precipitated in the form of a slurry within tank 11.

Product slurry is withdrawn through takeoff pipe 14 at a volume rate equivalent to the sum of the volume rates of materials added to liquid body 9 thereby maintaining essentially constant liquid volume in tank 11.

Acid or neutralizing agent and sodium silicate are fed to zone 6 in proportions such that the partially neutralized solution issuing from conduit 8 contains at least about 6 but rarely more than 10 or 12 moles of $SiO_2$ per mole of $Na_2O$. With the more common commercial sodium silicates (e.g., those containing 3 to 4 moles of $SiO_2$ to $Na_2O$), acid sufficient to neutralize from 30 to 70 percent, ideally 45 to 60 percent, of the $Na_2O$ content is used.

Moreover, the respective liquid volume rates fed via conduits 1 and 5 into mixing zone 6 should preferably be balanced or nearly so. This appears to result in the best mixing. Thus, from 0.7 to 1.5 volumes of silicate stream per volume of acid stream (on a unit time base) are fed for best results. Similarly, the respective streams should be at balanced pressures for most effective results.

Retention time in mixing zone 6 is but a fraction of a second in preferred practices. Typically, but 0.5 second or less elapses from the time liquids enter mixing zone 6 and the resulting partially neutralized siliceous solution contacts calcium chloride body 9. In this period, (a) the respective streams of acid and silicate are mixed and reacted to form a homogeneous siliceous solution and (b) pigmentary siliceous product is precipitated in tank 11.

Temperatures prevailing in mixing zone 6 are below 50° C. in most instances, typically from 20° C. to 45° C. and rarely below 0° C. Thus, the aqueous streams fed to the mixing zone are at temperatures admitting of this condition. Cooling within the zone by heat exchange to an external coolant it not particularly feasible.

The following example is a specific embodiment illustrating performance of this invention:

EXAMPLE I

Using the apparatus depicted in the drawing, finely divided siliceous pigment is prepared as follows:

Some 50 gallons per minute of water at about 45° C. under 100 pounds per square inch pressure is forwarded through conduit 1. By virtue of the venturi effect created by passage of liquid past throats 2, 25 gallons per minute of an aqueous sodium silicate solution at about 45° C. containing 3.36 moles of $SiO_2$ per mole of $Na_2O$ and 30 grams $Na_2O$ per liter is inspirated via conduit 4 into and diluted promptly with the water. The resulting aqueous solution of sodium silicate contains 10 grams $Na_2O$ per liter as it is discharged from conduit 1 into mixing block 3. Once diluted in conduit 1, it takes about 0.1 second for the silicate solution to discharge into mixing block 3.

Simultaneously, 50 gallons per minute of water at 45° C. under 100 pounds per square inch pressure is forwarded in conduit 5 past throats 7. This inspirates 1.5 gallons per minute of aqueous hydrochloric acid containing 30 weight percent hydrogen chloride (an amount of acid sufficient to neutralize about 55 percent of the $Na_2O$ content of the sodium silicate) through conduit 8 into conduit 5, discharging the dilute acid stream into mixing block 3.

Mixing zone 6 of mixing block 3 is a right vertical cylindrical cavity 3 inches in in diameter and 2 inches high. Conduits 1 and 4 are so positioned that they discharge liquids tangentially into mixing area 6 approximately midway between the bottom and top of the mixing zone and spaced approximately 180° from one another. This creates a downwardly spiraling stream of liquid within the lower half of zone 6.

In the lower half of mixing zone 6, the respective streams of acid and sodium silicate solution are instantaneously and effectively mixed, providing a downwardly rotating homogeneous partially neutralized siliceous solution having a tendency to precipitate out siliceous material.

This partially neutralized homogeneous siliceous solution discharges promptly from the bottom of mixing zone 6 through discharge conduit 10, a 1½ inch diameter tube 4 inches long, into a cylindrical 95 gallon tank having a diameter of 30 inches before there is any precipitation. This siliceous solution discharges from conduit 10 into tank 11 as a hollow cone of liquid which jets into the upper level of agitated liquid body 9. The upper level of liquid body 9 is about 12 inches below the bottom of discharge conduit 10. From the time the silicate solution is mixed with acid until it is added to liquid body 9 about 0.15 of a second elapses.

An aqueous solution of calcium chloride and sodium chloride containing 100 grams $CaCl_2$ per liter and 40 grams NaCl per liter at about 45° C. is fed at the rate of 20 gallons per minute through conduit 13 into tank 11.

Siliceous pigment precipitates from the partially neutralized aqueous siliceous solution by contact with the calcium chloride solution in liquid body 9. Essentially uniform conditions are maintained in liquid body 9 by agitating with stirrer 12. Liquid body 9 is at approximately 45° C., the respective liquid streams being added thereto entering at about 45° C.

About 150 gallons per minute of aqueous slurry of precipitated siliceous pigment containing about 2 to 3 weight percent solids is withdrawn from reactor tank 11 via conduit 14 located slightly below the liquid level. A vertical baffle is disposed in reactor tank 11 to preclude the possibility of partially neutralized aqueous siliceous solution shortcircuiting out through conduit 14. The average volume of body 9 during the process is about 75 gallons and the average liquid retention time in reactor tank 11 is about 0.5 minute.

Liquid slurry removed via conduit 14 is at a pH of about 9. This slurry is thereafter treated with hydrochloric acid to reduce its pH to about 7.5. Pigment is then recovered from this slurry by first washing the slurry with a multi-Dorr tank system, from which an aqueous slurry containing approximately 4 weight percent solids and substantially free of chloride salt is withdrawn and fed to a rotary vacuum drum filter. The resulting filter cake (16 to 20 percent solids by weight) is dried in a rotary dryer and then milled in a vertical mill.

Operating in the foregoing manner over substantial pediods of time, a white, friable, finely divided, flocculated, siliceous pigment is produced having the following typical chemical composition:

| | |
|---|---|
| $SiO_2$ percent by weight | 79.5 |
| CaO do | 7.2 |
| $Fe_2O_3$ do | 0.10 |
| $R_2O_3$* do | 0.47 |

NaCl _____do____ 0.76
H₂O loss on ignition _____ 12.9
H₂O loss at 105° C. _____ 4.0

* Mainly Al₂O₃ and Fe₂O₃.

Typical physical properties of the siliceous products are:

Surface area (BET) __square meters per gram__ 31
Predominant ultimate particle
 size _____millimicrons__ 80–160

The paper pigmenting qualities of the product produced in accordance with Example I is demonstrated as follows:

EXAMPLE II

Seven liters of an aqueous pulp slurry containing 2 percent pulp by weight (140 grams of pulp dry basis) is beaten to 400 milliliters freeness (Canadian standard). A 300 cubic centimeter portion of an aqueous slurry containing 14 grams of the pigment is mixed with this beaten pulp for 5 minutes. Thus, sufficient $Al_2(SO_4)_3 \cdot 18H_2O$ is added to adjust the slurry and white water to about pH 5. This pulp is sheeted on a laboratory Noble-Wood sheeting machine and representative sheets of the respective runs are tested to evaluate their ash contents, opacity, brightness, tear and burst factors.

The following data typifies and illustrates the effectiveness of the pigment prepared according to Example I in enhancing the optical properties of paper:

*Table I*

| Paper Properties | Pigment | |
|---|---|---|
| | None | Example I |
| Ash (Weight Percent)_____ | 0.3 | 7.4 |
| Opacity, Percent [1]_____ | 67 | 84.0 |
| Brightness, Percent_____ | 75 | 87.5 |
| Tear Factor [2]_____ | 28 | 5.5 |
| Burst Factor [3]_____ | 14 | |
| S (pig.)_____ | | 0.52 |
| S (paper)_____ | | 760×10⁻⁴ |

[1] Ratio of brightness of a single sheet with a black backing to the brightness of the same sheet with white backing.
[2] In grams per gram of an 8 inch by 8 inch sheet.
[3] In pounds per square inch per gram of an 8 inch by 8 inch sheet.

While this invention has been heretofore primarily described with reference to certain sodium silicates, water soluble alkali metal silicates are generally suitable. Sodium silicates containing between 2 and 5 moles (notably 3 to 4 moles) SiO₂ per mole of Na₂O are preferred, being commercially available and, as a rule, the least expensive alkali metal silicates. Water soluble sodium silicates containing substantially more Na₂O, for example, sodium monosilicate, are also useful although, because they have more alkali, they consume more acid in the process. Typical alkali metal silicates include potassium silicate and lithium silicate as well as mixed alkali metal silicates such as sodium potassium silicate.

In lieu of hydrochloric acid, other water soluble acids, especially those having a hydrogen cation and an anion which forms a water soluble salt with the alkali metal (of the alkali metal silicate) are effective for effecting partial neutralization. Inorganic acids of this type include nitric acid, nitrous acid, sulfuric acid or (SO₃), carbonic acid (or CO₂), the phosphoric acids, and sulfurous acid (or SO₂). Among the suitable organic acids, acetic acid, formic acid, the chloroacetic acids and the like may be mentioned. The partial neutralization may also be effected using acidic salts such as sodium bicarbonate.

Furthermore, those acids having anions which form water soluble salts with the cation of the salt used to initiate precipitation are preferred. Conversely, the anions of the acid and precipitation inducing salt are the same, i.e., with calcium chloride and hydrochloric acid. It is, however, possible to use acids such as carbonic and thus form both siliceous precipitate and calcium carbonate.

As herein contemplated, water soluble salts formed from the acid anion are those which dissolve in the reaction medium. Slightly water soluble salts, e.g., those having a solubility of at least 2 grams per liter of water (calcium sulfate) are to be included as water soluble when the reaction medium is sufficiently dilute to dissolve the amounts of salts which are present.

Precipitation from the aqueous partially neutralized siliceous solution takes place when the solution is dispersed in a metal salt solution, notably calcium chloride, or other water soluble salts. Water soluble metal halides, notably metal chlorides, comprise a preferred group of salts. Typical of such salts are sodium chloride, calcium chloride, barium chloride, strontium chloride, zinc chloride and mixtures thereof.

Moreover, it appears that besides playing an important role in instituting precipitation of pigment from the partially neutralized aqueous siliceous solution salts such as calcium chloride react with a siliceous component. At least, the precipitated siliceous product contains substantial concentrations of calcium oxide, presumably derived from the calcium chloride. In this process, not all the alkali metal oxide content of the alkali metal silicate is neutralized with the acid. As a consequence, the precipitated siliceous product contains calcium oxide or like metal oxides, depending upon the salt, in an amount approximating the alkali metal oxide content of the partially neutralized aqueous solution. In other words, the metal oxide content in the precipitated pigment corresponds approximately to that which would be present by reaction of the salt with the alkali metal silicate present in excess of that which is neutralized with the acid. If precipitation is conducted in the presence of a mixture of salts, especially those which form water insoluble metal oxide silicates, it is possible to obtain a siliceous pigment having a plurality of metal oxides corresponding to the cations of the metal salts.

Besides metal chloride salts, water soluble metal salts of strong acids (e.g., acids having an ionization constant of at least $1 \times 10^{-2}$) are suitable for initiating precipitation, especially when the salt cation would form water insoluble silicate under the conditions prevailing during precipitation. Metal nitrates, e.g., calcium nitrate and sodium nitrate; the bromides and iodides such as calcium bromide and sodium iodide; the metal sulfates such as sodium sulfate are illustrative.

As indicated by the example, these pigmentary compositions are precipitated in the form of quite dilute aqueous slurries containing considerable salt and from 1 to 10 percent (usually 2 to 5 percent) siliceous solids by weight. A substantial portion of the salt and water is separated from the siliceous pigment. Separatory practices such as decantation, filtration, centrifugation and the like remove some of the water and salt. One expedient entails utilizing equipment designed to effect decantation and salt removal for this purpose, e.g., Dorr tanks. Although not essential, agents such as quaternary ammonium salts, high molecular weight amines, aluminum salts such as aluminum chloride, and aluminum sulfate may be added to expedite settling.

Subsequent to water washing and possibly partially thickening the slurry, the slurry is filtered such as on a rotary vacuum filter to obtain a wet filter cake, usually containing from 15 to 20 percent solids by weight.

To provide a pigment composition dry to the touch, a substantial portion of the remaining water in the filter cake is then removed by drying through the use of heat to evaporate most of the water.

As precipitated, the pigments chemically contain an appreciable metal content (other than silicon) measurable as a metal oxide. When the anion of the salt used to induce precipitation forms water insoluble silicate, much of the metal content of the pigment corresponds to the anion of such salt. Thus, with calcium chloride as the salt, the siliceous pigment as precipitated contains an appreciable calcium oxide content.

A typical slurry of siliceous pigment precipitated in the presence of calcium chloride has a pH of about 9. For various purposes, it is often desirable to reduce the slurry pH by removal of a substantial portion but not necessarily all of such alkali metal oxide. This may be done by acidification of the aqueous siliceous pigment slurry, preferably before heat aging the slurry to stabilize the pigment against large changes in surface area. Heating, usually for several hours at 50° C. or higher, will effect sufficient stabilization.

Many water soluble acidic materials (inorganic or organic), notably acids which form water soluble salts with the metal of the oxide in the pigment, are effective in reducing this metal oxide content. Typical acids include hydrochloric, phosphoric, sulfuric, sulfurous, nitric, acetic and carbonic or corresponding anhydrides such as $SO_2$, $SO_3$ and $CO_2$. Also of use are acidic materials such as acid salts as exemplified by aluminum sulfate, although many such salts replace the metal oxide with a different metal oxide, e.g., $Al_2O_3$ in the case of aluminum sulfate or like aluminum salts.

While the present invention has been described with respect to specific details of certain embodiments, it is to be understood that it is not intended that the invention can be construed as limited to such details except insofar as they appear in the appended claims:

I claim:

1. A method of preparing siliceous pigment involving partial neutralization of aqueous alkali metal silicate solution with neutralizing agent to form an aqueous siliceous solution having a tendency to deposit water insoluble siliceous material and mixing such solution before it forms any substantial siliceous deposit with a metal salt whereby to precipitate siliceous pigment wherein partial neutralization and formation of siliceous solution is accomplished by feeding a first stream of alkali metal silicate solution and a second liquid stream of neutralizing agent tangentially into a vertical cylindrical mixing zone, forming in the mixing zone from said streams a downwardly spiraling homogeneous stream of aqueous siliceous solution, maintaining the mixing zone and temperature between 0° C. and 50° C. and discharging from the zone the aqueous siliceous solution at a level below that at which the streams are introduced downwardly into an aqueous liquid body of metal salt.

2. The method of claim 1 wherein the siliceous solution discharged from the mixing zone into the body of metal salt is in the form of a hollow cone.

3. The method of claim 1 wherein the alkali metal silicate is sodium silicate containing from 2 to 5 moles of $SiO_2$ per mole of $Na_2O$, the neutralizing agent is hydrochloric acid and the metal salt is calcium chloride.

References Cited in the file of this patent

UNITED STATES PATENTS

| | | |
|---|---|---|
| 1,842,877 | Müller et al. | Jan. 26, 1932 |
| 2,679,463 | Alexander et al. | May 25, 1954 |
| 2,739,876 | Felger | Mar. 27, 1956 |
| 2,805,956 | Pechukas | Sept. 10, 1957 |
| 2,943,971 | Allen | July 5, 1960 |
| 3,034,913 | Lagerstrom | May 15, 1962 |